Nov. 18, 1969     H. M. STRONG ET AL     3,478,595

THERMOCOUPLE PRESSURE-SENSING MEANS

Filed May 17, 1968     2 Sheets-Sheet 1

Inventors:
Herbert M. Strong,
Roy E. Tuft,
by
Their Attorney.

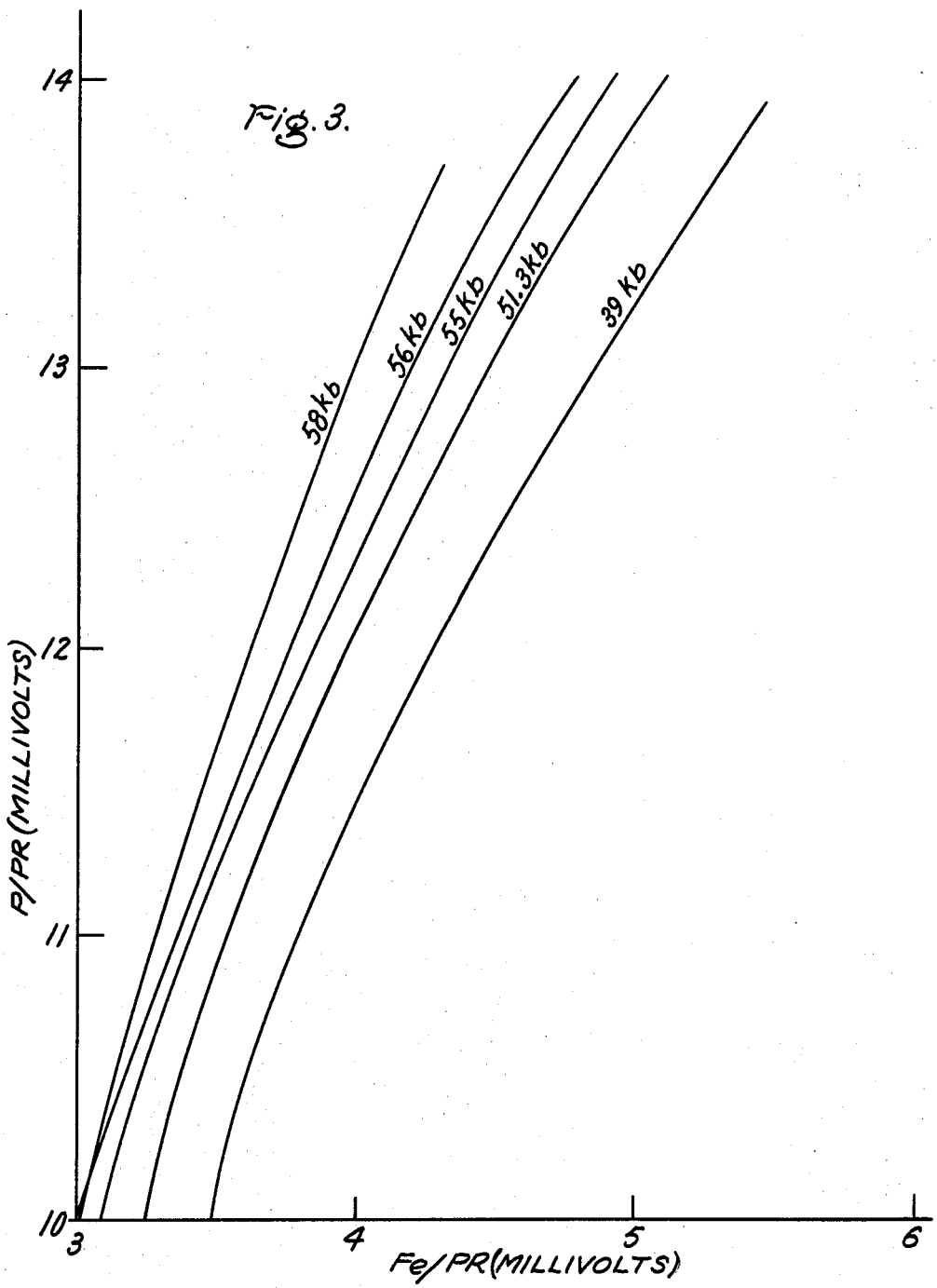

United States Patent Office 3,478,595
Patented Nov. 18, 1969

3,478,595
THERMOCOUPLE PRESSURE-SENSING MEANS
Herbert M. Strong, Schenectady, and Roy E. Tuft, Guilderland Center, N.Y., assignors to General Electric Company, a corporation of New York
Filed May 17, 1968, Ser. No. 729,974
Int. Cl. G01l 21/12
U.S. Cl. 73—399      4 Claims

ABSTRACT OF THE DISCLOSURE

The combination of specific pressure-sensitive thermoelectric couples (iron-platinum 10 rhodium and platinum-platinum 10 rhodium) having a very large difference in pressure error behavior are described. The preferred construction shown employs three wires (iron, platinum and platinum 10 rhodium) sharing a common junction which is subjected to the pressure conditions to be sensed. The millivolt output of both the iron-platinum 10 rhodium (Fe/PR) couple and the platinum-platinum 10 rhodium (P/PR) couple are simultaneously recorded on an X–Y recorder.

BACKGROUND OF THE INVENTION

This invention relates generally to the measuring and testing art and is more particularly concerned with novel means for the accurate measurement of extreme pressures such as are encountered during the application of various materials to very high pressure and temperature conditions in superpressure apparatuses.

Investigations into the behavior of materials under the influence of superpressures and elevated temperatures have received considerable emphasis during the past decade and the increasing sophistication in apparatus and methods employed has shown with ever-increasing clarity the necessity for means for the rapid accurate determination of pressure during actual superpressure operations. It has been suggested by Dr. F. P. Bundy in his article, "Effective Pressure on EMF of Thermocouples" (Journal of Applied Physics, vol. 32, No. 3, 483–488, March 1961), that the pressure in the pressure chamber of a superpressure apparatus can be deduced by employing a multiple-wire thermocouple set in the pressure chamber. At elevated pressures the various thermocouple combinations provide different readings representing various apparent temperature values. In the above-identified article one of the combinations selected is to be effected by pressure only a relatively small amount and is to serve as a standard. It is then postulated that the pressure in the pressure cell can be deduced from the deviation of the readings of the other thermocouple from the standard. Of course, it would appear that thermocouple pairs can also be used in which both kinds of thermocouples have EMF outputs, which deviate with pressure, but by different amounts. The relationship between their simultaneous readings at high pressure is a function of pressure and can be used to determine pressure. Other work has been done determining the pressure errors in thermocouples as, for example, has been described in the article "Pressure Dependence of the EMF of Thermocouples to 1300° C. and 50K Bar" by R. E. Hanneman and H. M. Strong (Journal of Applied Physics, vol. 36, No. 2, 523–528, February 1965).

Often, in the conduct of superpressure investigations complete reliance is placed upon precalibration methods, which use first order phase transformations of standard materials at or near room temperature. As a result large pressure variations may go undetected at elevated pressures under heated conditions due to thermal expansion.

A considerable improvement in the accuracy of measurement by the detection of pressure EMF by the use of thermocouples is described in United States Patent No. 3,332,286—Strong, wherein the difference in pressure EMF effects of a pair of thermocouples having different pressure EMF effects is accurately determined.

The reference to "platinum 10 rhodium" or "PR" means an alloy consisting of 90% by weight of platinum and 10% by weight of rhodium. This is a well-known thermoelectric material.

However, the art is still in need of even more stable, sensitive means for continuously sensing pressure in the reaction cell of a high pressure apparatus, particularly when the reaction cell is simultaneously being subjected to temperatures ranging as high as from about 1000° to 1400° C.

SUMMARY OF THE INVENTION

The instant invention fulfills this need and, in addition, also provides an initial pressure check for the operator of high pressure apparatus at a temperature level of about 650° C.

The pressure-temperature probe of this invention preferably consists of a platinum (P), platinum 10 rhodium (PR) and iron (Fe) thermoelectric common junction, which may be situated as desired relative to the reaction zone within a high temperature, high pressure reaction cell. The thermoelectric output of the P/PR and Fe/PR junctions are simultaneously plotted against each other on an X–Y recorder. Each simultaneous reading of both junctions produces a point lying on a curve, which is the characteristic response curve under the pressure conditions existing in the cell. At the same time, the P/PR reading, when pressure corrected, indicates the temperature in the cell at that specific moment at the location of the thermoelectric junction.

BRIEF DESCRIPTION OF THE DRAWING

A preferred embodiment of the invention is illustrated in the accompanying sheet of drawing in which:

FIG. 3 is an enlarged portion (with a change in the scale relation of ordinate and abscissa) of FIG. 2 showing P/PR output in millivolts vs. Fe/PR output in millivolts for various pressures ranging from 39 to 58 kilobars (kb.).

DESCRIPTION OF THE PREFERRED EMBODIMENT

Figure 1:
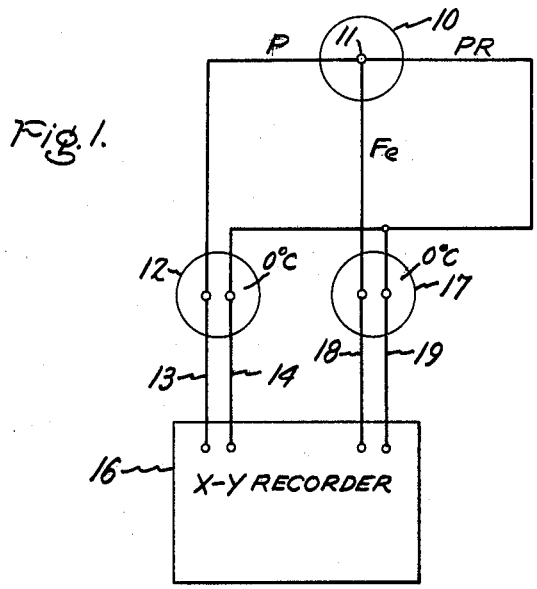
FIG. 1 is a schematic representation of apparatus constituting the high temperature, high pressure measuring device of this invention.

In the device shown schematically in FIG. 1, pressure is to be measured in the reaction vessel 10. The designation adjacent each of the three wires proceeding from the common junction 11 and exiting from reaction vessel 10 indicates the composition thereof. The PR wire is common to the two thermocouples (Fe/PR and P/PR). Reaction vessel 10, which is schematically represented, could be any of the variety of reaction vessel configurations as, for example, are described in United States Patents 2,941,251—Strong, 2,944,289—Hall, 3,030,662 —Strong and 3,088,170—Strong. In general, such reaction vessels are employed in the superpressure art as containment vessels for enclosures within which specimen materials are positioned in order to subject such materials to high pressure, high temperature conditions either for the manufacture of some form of matter or for research investigations into the behavior of materials under the aforementioned conditions.

Leads comprising each of the aforementioned thermocouples are conducted to two reference junctions maintained at 0° C. Thus, the leads of thermocouples P/PR terminate at junction 12 to connect to outgoing copper leads 13, 14 which conduct the electrical output of this thermocouple to the Y function of the X–Y recorder 16. Similarly, the leads of the Fe/PR thermocouple are brought to reference junction 17 and copper heads 18, 19 conduct the electrical output of this thermocouple to the X function of X–Y recorder 16.

Figure 2:
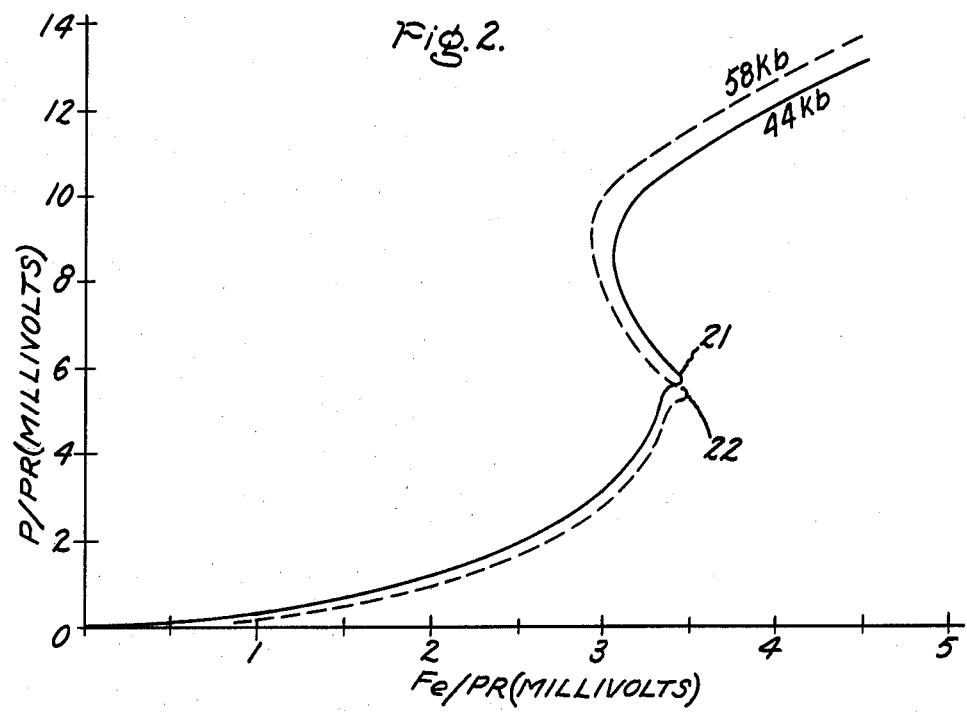
FIG. 2 is a display of typical graphs obtained on the recorder for P/PR millvolt output vs. Fe/PR millivolt output for various temperatures at two different pressures.

A single curve, such as the curve shown as a solid line in FIG. 2, reflects the vector sums of the simultaneous thermoelectric outputs of these two couples during the application of a constant pressure (44 kb.) and a constantly increasing temperature within the reaction cell 10. The dotted line curve in FIG. 2 is a similar representation depicting the vector sums of the simultaneous thermoelectric outputs of these same couples under the application of gradually increasing temperature and the constant pressure of 58 kb. within reaction cell 10.

The abrupt changes in thermoelectric output manifest at points 21, 22 in the solid and dotted line curves, respectively, provides unmistakable indication of the points at which the alpha-to-gamma iron transistion ($Fe_\alpha \rightarrow Fe_\gamma$) occurs in each case. It may be seen from a comparison of the location of points 21 and 22 that the P/PR thermoelectric output at which the alpha-to-gamma transition occurs for iron is a function of the prevailing pressure. Because of this abrupt change in the Fe/PR thermoelectric output due to the $\alpha$-to-$\gamma$ transition of the iron lead, the P/PR readings (pressure corrected) are used to indicate the temperature in reaction vessel 10.

The distinct maximum in the curve produced on an X–Y recording of the themocouple outputs, because of the $\alpha$-to-$\gamma$ change, is uniquely useful to the high pressure apparatus operator. Thus, in the early stages of an experiment, which is to be conducted at very high pressures and temperatures, as soon as the temperature has been raised to the vicinity of about 650° C. and the iron $\alpha$-to-$\gamma$ transition is manifest, the operator can judge by the position of the transition relative to the predetermined family of curves for the particular apparatus reflecting the simultaneous thermoelectric responses of the P/PR and Fe/PR couples (a) whether the apparatus is actually developing the pressure required, (b) whether corrections are needed and (c) if the correction required is beyond the capabilities of the apparatus, to save time by beginning the experiment over again.

As has been indicated hereinabove, the P/PR reading, when pressure corrected gives the temperature in reaction vessel 10 and if the P/PR reading indicative of the iron $\alpha$-to-$\gamma$ transition is high, as for example, 6 millivolts, the apparatus is providing a relatively low (about 39 kb.) pressure while if the iron $\alpha$-to-$\gamma$ P/PR reading at the iron $\alpha$-to-$\gamma$ transition is relatively low (about 5.4 millivolts) then, the relatively high pressure of about 58 kb. is being developed in reaction cell 10.

Thus, with the thermocouple arrangement of this invention, not only has a combination of metals been employed, which has chemical and thermoelectric stability for many hours at temperatures at least as high as 1350° C. remaining in the solid state to provide constant high sensitivity monitoring of pressure, but in addition a convenient pressure-sensitive phase change is available to the operator at a fairly low temperature (about 650° C.) early in a high pressure high temperature experiment.

In experiments employing the instant three-wire common junctions (or a pair of junctions, P/PR and Fe/PR, located at the same level in the temperature gradient), it was expected that an abrupt change in thermoelectric output of the Fe/PR junction would occur, but the advantageous behavior of the Fe/PR junction under temperature conditions exceeding about 400° C. above the iron $\alpha$-to-$\gamma$ transition temperature was completely unexpected. At about 400° C. past the iron $\alpha$-to-$\gamma$ transition: (a) the Fe/PR output increased again keeping pace with the temperature, (b) the relation between the millivolt output of the P/PR and $\gamma$Fe/PR junctions yielded the largest pressure error difference discovered thus far and (c) the $\gamma$Fe/PR junction proved to be stable to above about 1400° C. The very significant pressure error difference referred to above is manifest in FIG. 3 wherein there may be seen a substantial spread between the several members shown of a typical family of curves generated at different pressures in a high pressure high temperature apparatus of the well-known "belt-type" described in U.S. Patent No. 2,941,248—Hall, and using a reaction cell construction (exclusive of pressure compensating means and pressure monitoring means shown) substantially as shown in U.S. Patent No. 3,292,997—Strong. At a typical operating temperature in the preparation of diamond, for example, the P/PR reading would be about 13.0 mv. and the Fe/PR mv. reading would vary by greater than 0.04 mv./kb., an amount enabling relatively easy extrapolation and interpolation of the actual pressure condition in the cell based on the primary standard employed.

In utilizing this invention with any given piece of high temperature high pressure apparatus, particularly those in which temperatures above about 1000° C. are employed the relationship between the force applied at the ram and the pressure in the cell for a broad range of force applications at room temperature is developed using the well-known phase transitions such, for example, as occur in bismuth. Because in the case of almost all materials of which reaction cell components would be made, expansion of these components occurs it is recognized that these same applications of force, when accompanied by an increase in cell temperature actually produced higher pressures than would be indicated by cold calibration curves.

Next, high temperature calibration curves of pressure are prepared by relating to various high temperature phenomenon such as to the graphite-to-diamond transition manifest by the Berman-Simon equilibrium line [Zeit. für Elktrochemie 59, 333–338 (1955)]. Once a high temperature pressure curve has been prepared, the temperature-dependent pressure error occurring in that paticular cell structure at that approximate temperature and at various pressures may be determined and this increment employed for an approximate calibration of reaction cell pressure in terms of applied force at high temperatures in the range considered (e.g. 1000–1400° C.).

With this calibration available three or four reaction cell pressure values in the range of interest may be selected and for each pressure, the thermocouple arrangement of this invention may be incorporated into the cell and heated at constant applied force to about 1400° C. Typically this procedure would be carried out twice at each pressure and the readings then averaged.

Thus, an improved combination of thermoelectric materials has been disclosed providing continuous temperature-pressure monitoring capabilities at temperatures above 1000° C.

Thereafter, whenever that calibrated reaction vessel construction is employed in the given apparatus and the thermocouple arrangement of the instant invention is employed therein, a continuous monitoring of the temperature and pressure within the cell to provide an accuracy for the cell pressure ranging from about ⅓ to ½ kb. (based on the standard primary calibration procedure employed) may be relied upon. Indications are that the instant invention provides a sensitivity of from about 0.05 to 0.06 millivolt per kb. at 50 kb. whereby in any series of high pressure high temperature experiments the relative pressures between experiments in that series can be very accurately compared.

What we claim as new and desire to secure by Letters Patent of the United States is:

1. An apparatus for in situ determination of pressure during high pressure operations conducted under elevated temperature conditions comprising in combination:
   (a) a platinum-platinum 10 rhodium thermocouple junction,
   (b) an iron-platinum 10 rhodium thermocouple junction,
   (c) first and second reference junctions,
      (1) said first reference junction being attached to separate leads from said platinum-platinum 10 rhodium thermocouple junction and said second reference junction being attached to separate leads from said iron-platinum 10 rhodium thermocouple junction, both said first and second reference junctions being held at constant temperature,
   (d) means for simultaneously measuring the electrical output from both thermocouple junctions and plotting the vector sum thereof as a single curve and
   (e) means for connecting said first and second reference junctions to said measuring and recording means.

2. Pressure measuring apparatus substantially as recited in claim 1 wherein the measuring and recording means is an X–Y recorder.

3. Pressure measuring apparatus substantially as recited in claim 1 wherein the platinum, platinum 10 rhodium and iron leads share a common thermocouple junction.

4. A method for measuring pressure in situ in the reaction cell of a high pressure apparatus under high pressure, high temperature conditions comprising the steps of:
   (a) locating at the same level in the temperature gradient within the reaction cell a platinum-platinum 10 rhodium thermocouple junction and an iron-platinum 10 rhodium thermocouple junction,
   (b) simultaneously measuring the separate EMF outputs from said thermocouple junctions and
   (c) recording the vector sum of the measured EMF outputs.

References Cited

UNITED STATES PATENTS 3,332,286   7/1967   Strong _____ 73—399

DONALD O. WOODIEL, Primary Examiner